United States Patent
Wang et al.

(10) Patent No.: US 12,482,802 B2
(45) Date of Patent: Nov. 25, 2025

(54) METHOD FOR TUNING LITHIUM WETTABILITY OF AN ANODE CURRENT COLLECTOR USING PLASMA SURFACE MODIFICATION

(71) Applicant: GM GLOBAL TECHNOLOGY OPERATIONS LLC, Detroit, MI (US)

(72) Inventors: Ming Wang, Sterling Heights, MI (US); Mary Gilliam, Farmington Hills, MI (US); Shaomao Xu, Sterling Heights, MI (US); Diptak Bhattacharya, Royal Oak, MI (US); Xiaowei Yu, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 105 days.

(21) Appl. No.: 18/500,339

(22) Filed: Nov. 2, 2023

(65) Prior Publication Data
US 2025/0149532 A1 May 8, 2025

(51) Int. Cl.
| | |
|---|---|
| H01M 4/04 | (2006.01) |
| C23C 2/00 | (2006.01) |
| C23C 2/02 | (2006.01) |
| C23C 2/04 | (2006.01) |
| C23C 24/10 | (2006.01) |
| H01M 4/1395 | (2010.01) |

(Continued)

(52) U.S. Cl.
CPC .......... *H01M 4/0404* (2013.01); *C23C 2/006* (2013.01); *C23C 2/02* (2013.01); *C23C 2/04* (2013.01); *C23C 24/106* (2013.01); *H01M 4/0471* (2013.01); *H01M 4/1395* (2013.01); *H01M 4/382* (2013.01); *H01M 4/667* (2013.01); *H01M 4/669* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 5,642,562 A | * | 7/1997 | Tuttle .................. | H01M 4/0404 29/623.3 |
| 2019/0237758 A1 | * | 8/2019 | Dadheech .......... | H01M 4/0419 |

(Continued)

FOREIGN PATENT DOCUMENTS

| | | |
|---|---|---|
| DE | 102019102037 A1 | 8/2019 |
| DE | 102021131163 A1 | 8/2022 |

(Continued)

OTHER PUBLICATIONS

Lin "New strategy to significantly improve the wettability of various metals by molten lithium" (2024).*

(Continued)

*Primary Examiner* — Austin Murata (57) ABSTRACT

A method for manufacturing an anode electrode includes supplying an anode current collector; coating a first portion of the anode current collector with a precursor coating; not coating a second portion of the anode current collector with the precursor coating; treating the anode current collector with plasma to at least one of decrease lithium wettability of the first portion and to increase lithium wettability of the second portion; and coating the anode current collector with lithium metal to form an anode active material layer.

20 Claims, 6 Drawing Sheets

(51) Int. Cl.
    *H01M 4/38*     (2006.01)
    *H01M 4/66*     (2006.01)
    *H01M 4/02*     (2006.01)

(56) References Cited

U.S. PATENT DOCUMENTS

| | | | |
|---|---|---|---|
| 2020/0017948 A1* | 1/2020 | Van Schoonevelt | C23C 2/29 |
| 2022/0271264 A1 | 8/2022 | Xu et al. | |
| 2023/0163368 A1* | 5/2023 | Cui | H01M 4/131 |
| | | | 429/126 |
| 2023/0223546 A1 | 7/2023 | Amouzegar et al. | |
| 2025/0006897 A1* | 1/2025 | Johnston | H01M 4/628 |

FOREIGN PATENT DOCUMENTS

| | | |
|---|---|---|
| DE | 102022104935 A1 | 9/2023 |
| WO | WO-2020264000 A1 | 12/2020 |

OTHER PUBLICATIONS

Wang et al. "Fundamental study on the wetting property of liquid lithium" (2018).*
Wang et al. "Tuning wettability of molten lithium via a chemical strategy for lithium metal anodes" (2019).*
U.S. Appl. No. 17/970,659, filed Oct. 21, 2022, Ren et al.
U.S. Appl. No. 18/115,429, filed Feb. 28, 2023, Xu et al.
German Office Action from counterpart DE1020231364162, dated Aug. 2, 2024.

* cited by examiner

METHOD FOR TUNING LITHIUM
WETTABILITY OF AN ANODE CURRENT
COLLECTOR USING PLASMA SURFACE
MODIFICATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to a method for manufacturing anode electrodes.

Electric vehicles (EVs) such as battery electric vehicles (BEVs), hybrid vehicles, and/or fuel cell vehicles include one or more electric machines and a battery system including one or more battery cells, modules, and/or packs. A power control system is used to control charging and/or discharging of the battery system during charging and/or driving.

Battery cells include one or more cathode electrodes, anode electrodes, and separators. The cathode electrodes include a cathode active material layer (including cathode active material) arranged on a cathode current collector. The anode electrodes include an anode active material layer (including anode active material) arranged on an anode current collector.

SUMMARY

A method for manufacturing an anode electrode includes supplying an anode current collector; coating a first portion of the anode current collector with a lithiophilic coating; not coating a second portion of the anode current collector with the lithiophilic coating; treating the anode current collector with plasma to at least one of decrease lithium wettability of the first portion and to increase lithium wettability of the second portion; and coating the anode current collector with lithium metal to form an anode active material layer.

In other features, the first portion corresponds to an edge of the anode current collector. Coating the anode current collector with lithium metal comprises passing the anode current collector through a bath including molten lithium metal. In other features, directing gas at the anode current collector after the anode current collector passes through the bath to at least one of remove excess molten lithium metal and improve thickness uniformity of the molten lithium metal.

In other features, the gas is selected from a group consisting of molecular nitrogen and argon.

The method includes injecting a secondary gas into the plasma. Coating the anode current collector with the lithium metal comprises supplying molten lithium metal onto the anode current collector using a coating device. Coating the anode current collector with the lithium metal comprises supplying lithium metal powder at spaced intervals on the anode current collector using an engraved roller including a plurality of cavities; and heating the lithium metal powder to melt the lithium metal powder.

In other features, the method includes heating the engraved roller to melt the lithium metal powder. Heating the lithium metal powder comprises heating using at least one of plasma, infrared heating, a furnace, an oven, and induction heating. The method includes supplying a plasma gas for the plasma that includes one or more elements selected from a group consisting of nitrogen (N), phosphorus (P), oxygen (O), a halogen, and/or combinations thereof.

In other features, the method includes supplying a plasma gas for the plasma selected from a group consisting of molecular nitrogen ($N_2$), ammonia ($NH_3$), an amine compound, a silazane, and/or combinations thereof. The method includes treating the anode current collector with oxygen plasma prior to coating the first portion of the anode current collector with the lithiophilic coating.

In other features, the anode current collector is made of stainless steel and further comprising heating the second portion of the anode current collector to a temperature in a range from 250° C. to 400° C. prior to treating the anode current collector with plasma. The method includes cooling the first portion of the anode current collector to a temperature in a range from 10° C. to 25° C. prior to treating the anode current collector with plasma.

A method for manufacturing an anode electrode includes supplying an anode current collector; coating a first portion of the anode current collector with a lithiophilic coating wherein the first portion corresponds to an edge of the anode current collector; not coating a second portion of the anode current collector with the lithiophilic coating, wherein the second portion corresponds to a location where an anode active material layer of the anode current collector is arranged; and treating the anode current collector with plasma to at least one of decrease lithium wettability of the first portion and to increase lithium wettability of the second portion. A plasma gas for the plasma includes one or more elements selected from a group consisting of molecular nitrogen ($N_2$), ammonia ($NH_3$), an amine compound, a silazane, and/or combinations thereof. The method includes coating the anode current collector with lithium metal to form the anode active material layer by passing the anode current collector through a bath including molten lithium metal.

In other features, the method includes directing gas at the anode current collector after the anode current collector passes through the bath to at least one of remove excess molten lithium metal and improve thickness uniformity of the molten lithium metal, wherein the gas is selected from a group consisting of molecular nitrogen and argon. The method includes injecting a secondary gas into the plasma. The method includes treating the anode current collector with oxygen plasma prior to coating the first portion of the anode current collector with the lithiophilic coating.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While battery cells according to the present disclosure are shown in the context of electric vehicles and/or testing of battery cells for electric vehicles, the battery cells can be used in stationary applications and/or other applications.

Battery cells with lithium metal anode electrodes may be used in high-power batteries for electric vehicles. Several manufacturing methods are under development for lithium metal anode electrodes using molten lithium as the active material. However, poor wettability of molten lithium on the anode current collector has prevented uniform coating.

The present disclosure relates to a plasma surface modification that is used to modify the surface of anode current collector to tune the wettability of the anode current collector to molten lithium. The manufacturing methods described herein are simple, cost-effective, and can be integrated into roll-to-roll (R2R) processes. The wettability of molten lithium can be adjusted by using different lithiophilic coatings and/or plasma gas modifications.

In some examples, a first portion of the anode current collector (such as edges where external tabs are arranged) is coated with the lithiophilic coating to reduce the wettability of the first portion to molten lithium (e.g., to achieve a sharp edge and maintain a clean surface for subsequent processing). A second portion of the anode current collector corresponding to a location of an anode active material layer is not coated. The plasma directed to the surface of the anode current collector cures the lithiophobic coating on the first portion to reduce the wettability and/or modifies the surface of the second portion to increase the wettability. After coating with the lithiophilic coating and the plasma modification, the second portion is coated with molten lithium that forms an improved bond due to the increased wettability. In contrast, the first portion remains clear of molten lithium to provide a clean surface for notching and welding of the external tabs.

Figure 1:
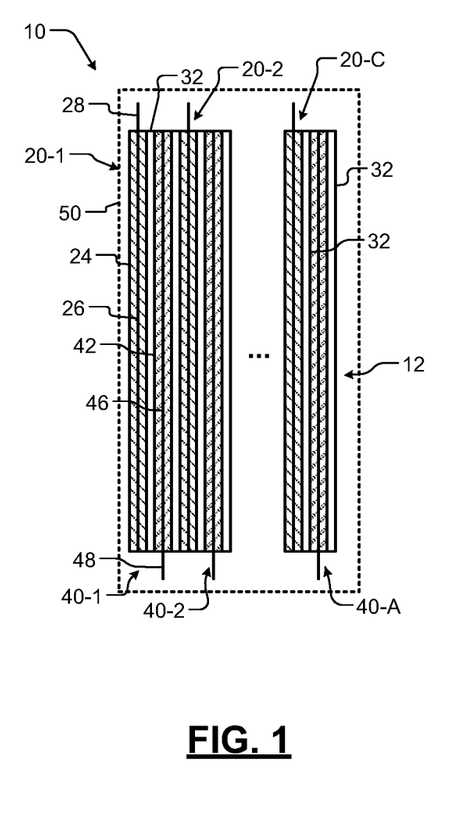
FIG. 1 is a side cross sectional view of a battery cell including one or more anode electrodes according to the present disclosure.

Referring now to FIG. 1, a battery cell 10 includes C cathode electrodes 20, A anode electrodes 40, and S separators 32 arranged in a predetermined sequence in a battery cell stack 12, where C, S and A are integers greater than zero. The C cathode electrodes 20-1, 20-2, . . . , and 20-C include cathode active material layers 24 arranged on one or both sides of a cathode current collector 26.

During charging/discharging, the A anode electrodes 40 and the C cathode electrodes 20 exchange lithium ions. The A anode electrodes 40-1, 40-2, . . . , and 40-A include anode active material layers 42 including lithium metal (from molten lithium and/or other manufacturing methods) (arranged on one or both sides of the anode current collectors 46). In some examples, the cathode active material layers 24 comprise coatings including one or more active materials, one or more conductive additives, and/or one or more binder materials that are applied to the current collectors (e.g., using a wet or dry roll-to-roll process).

In some examples, the cathode current collector 26 and/or the anode current collector 46 comprises metal foil, metal mesh, perforated metal, 3 dimensional (3D) metal foam, and/or expanded metal. In some examples, the current collectors are made of one or more materials selected from a group consisting of copper, stainless steel, brass, bronze, zinc, aluminum, and/or alloys thereof. In some examples, the anode current collectors are made of copper or stainless steel. External tabs 28 and 48 extend from the current collectors and can be arranged on the same or different sides of the battery cell stack 12. The external tabs 28 and 48 are connected to terminals of the battery cells.

Figure 2A:
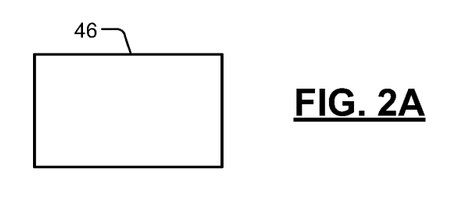
FIGS. 2A to 2D are plan views illustrating a method for treating an anode current collector using a lithiophilic coating and plasma and coating the anode current collector with molten lithium according to the present disclosure.
Figure 2B:
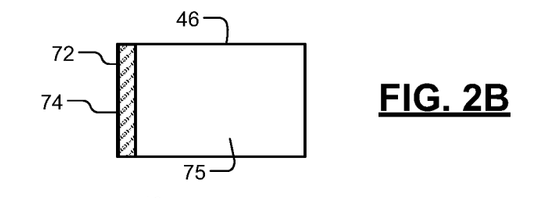

Referring now to FIGS. 2A to 2D, a first portion 72 (e.g., an edge) of the anode current collector 46 (FIG. 2A) is coated with a lithiophilic coating 74 (FIG. 2B). A second portion 75 of the anode current collector 46 (corresponding to a future location of the anode active material layer 42) remains uncoated. For example, the first portion 72 may correspond to a location of the external tab 48.

Figure 2C:
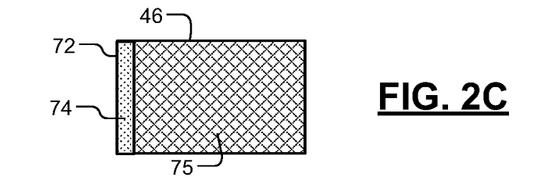
Figure 2D:
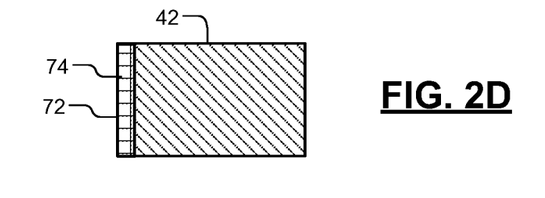

Then, the anode current collector 46 and the lithiophilic coating 74 are exposed to a plasma modification to facilitate a chemical reaction of the lithiophilic coating 74 and/or the second portion 75 to tune wettability. The chemical reaction causes the first portion 72 to be more lithiophobic and/or the second portion 75 to be more lithiophilic. In other words, the plasma modification reduces the wettability to molten lithium of a precursor coating 73 and/or increases the wettability of the second portion 75 to molten lithium (FIG. 2C). In FIG. 2D, molten lithium is coated preferentially onto the second portion 75 relative to the first portion 72. In some examples, the first portions 72 (e.g., edges) are arranged along opposite sides of the second portion 75 of the anode current collector 46 and the anode current collector 46 is cut in half to create two anode electrodes at a time.

Figure 3:
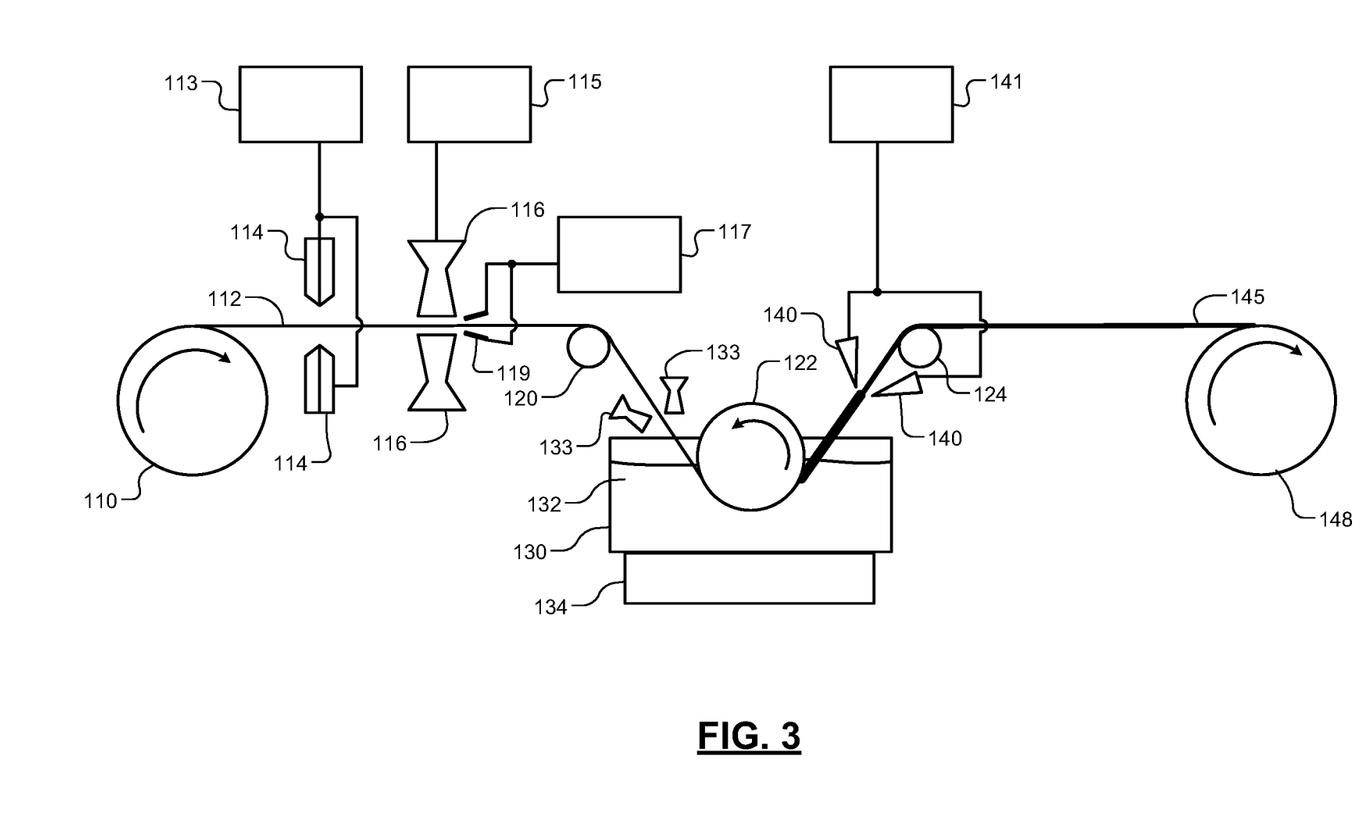
FIG. 3 is a functional block diagram of an example of a method for tuning lithium wettability of an anode current collector using a lithiophilic coating and plasma and coating an anode electrode with molten lithium from a bath according to the present disclosure.

Referring now to FIG. 3, a roll 110 supplies an anode current collector 112 over guide rollers 120, 122, and 124 through a bath 130 and onto a roll 148. A coating source 113 supplies a precursor material to a coating device 114 that coats the first portion of the anode current collector 112 with the precursor coating.

A first gas source 115 supplies plasma gas or a plasma gas mixture to plasma generator 116 that maintains plasma adjacent to the anode current collector 112. The plasma causes the precursor coating on the first portion and/or the second portion of the anode current collector 112 to undergo a chemical reaction. In some examples, a second gas source 117 supplies a secondary gas or gas mixture to gas injectors 119 that inject gas directly into the plasma. After the plasma modification, the anode current collector 112 is guided by the guide rollers 120, 122 and 124 into the bath 130 including molten lithium 132. A heater 134 may be used to heat the bath 130 to a predetermined temperature greater than a melting temperature of lithium metal.

After coating the anode current collector with the molten lithium, gas blades 140 that are connected to a gas source 141 supply gas against one or both outer surfaces of the anode current collector 112 to remove excess molten lithium and/or to improve thickness uniformity of the molten lithium metal. In some examples, the gas source 141 supplies an inert gas such as molecular nitrogen ($N_2$), argon (Ar) or other suitable gas. After coating with the molten lithium, an anode electrode 145 is collected onto the roll 148. In some examples, the anode electrode 145 is cooled prior to collection on the roll 148 using cooling gas flow, cooled rollers, a chiller, or other cooling source (not shown).

In some examples, one or more additional plasma source(s) 133 expose a surface of the molten lithium to plasma to decrease the surface tension of the lithium and improve wettability of the molten lithium to the current collector. The plasma gas or a secondary gas includes compounds comprising elements that form new Li-X bonds that are more wettable to the anode current collector.

In some examples, the surface modification includes coating the first portion of the anode current collector with the precursor coating and converting the precursor coating using plasma modification to form a lithiophobic surface. In some examples, plasma modification of the second portion of the anode current collector creates a lithiophilic surface. The plasma modification of the second portion improves bonding strength with molten lithium.

In some examples, the plasma gas mixture includes compounds containing elements or chemical groups that are incorporated into the surface of the anode current collector (in areas that are not coated with the precursor coating) to improve the wettability of the surface to the molten lithium. In some examples, the plasma gas mixture comprises a gas selected from a group consisting of molecular nitrogen ($N_2$), ammonia ($NH_3$), an amine compound, a silazane, and/or combinations thereof. In other examples, the plasma gas or plasma gas mixture includes compounds that are incorporated into the surface of the anode current collector and contain one or more elements that form bonds with the molten lithium. In some examples, the plasma gas mixture includes compounds containing one or more of nitrogen (N), phosphorus (P), oxygen (O), a halogen, and/or combinations thereof. In some examples, the plasma modification decreases surface tension of the lithium and improves wettability of the molten lithium (e.g., for example when the plasma is directed to the molten lithium pool surface to form new Li—X bonds, which are more wettable onto the current collector).

In some examples, the secondary gas mixture is injected directly into the plasma after the plasma is struck and includes one or more compounds containing elements or chemical groups that are incorporated onto the surface of the anode current collector to improve the molten lithium wettability.

In some examples, the plasma surface modification is performed immediately prior to immersing the substrate in the molten lithium. The plasma surface modification enables creation of new bonds on the surface of the current collector that are wettable to lithium. In some examples, the precursor coating and the plasma surface modification of the precursor coating creates lithiophobic surface portions along the edge(s) of the anode electrode to enable a clean edge area for a subsequent notching and/or welding process for the external tabs.

Figure 4:
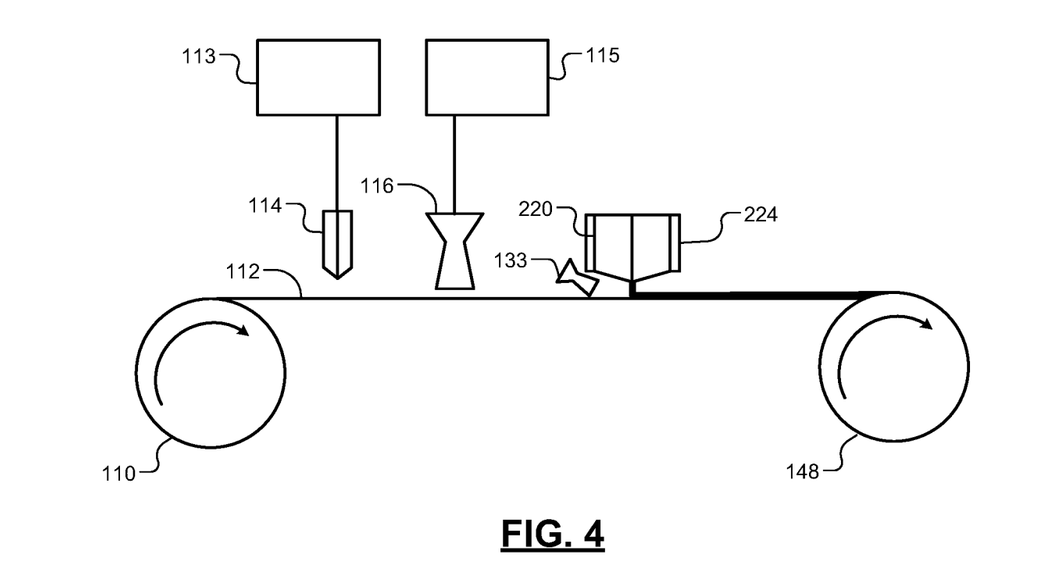
FIG. 4 is a functional block diagram of an example of a method for tuning lithium wettability of an anode current collector using a lithiophilic coating and plasma and coating an anode electrode with molten lithium using a coating device according to the present disclosure.

Referring now to FIG. 4, an example of single-sided coating is shown. After coating the edge of the anode current collector with the precursor coating using the coating device 114 and plasma modification using the plasma generator 116, a coating device 220 supplies molten lithium onto the anode current collector 112. In some examples, the coating device 220 comprises a slot die and/or a doctor blade that provide a uniform layer of the molten lithium onto the anode current collector 112. In some examples, the coating device 220 comprises a heater 224 configured to heat the lithium above a melting temperature of lithium. In some examples, the process is repeated to coat the opposite side of the anode current collector.

Figure 5A:
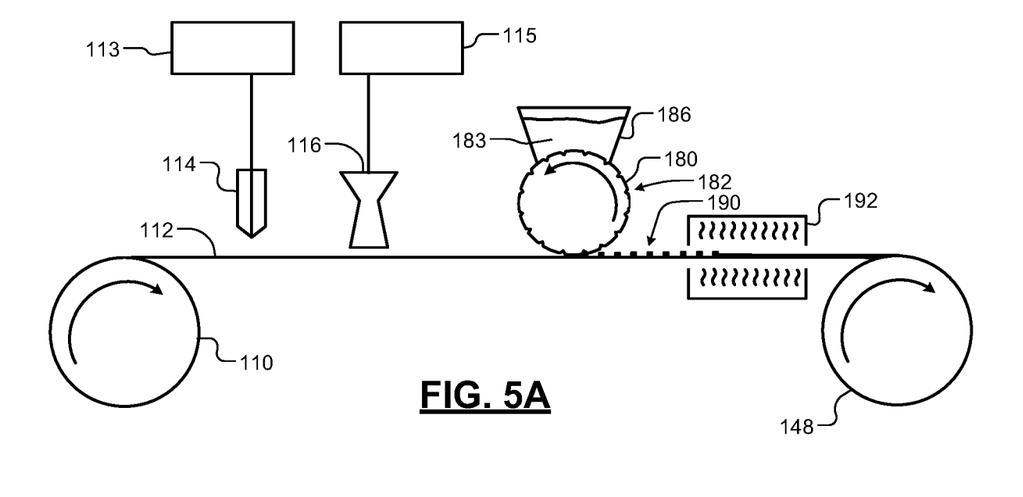
FIGS. 5A to 5C are functional block diagrams of examples of methods for tuning lithium wettability of an anode current collector using a lithiophilic coating and plasma and coating an anode electrode with molten lithium using an engraved roller according to the present disclosure.
Figure 5B:
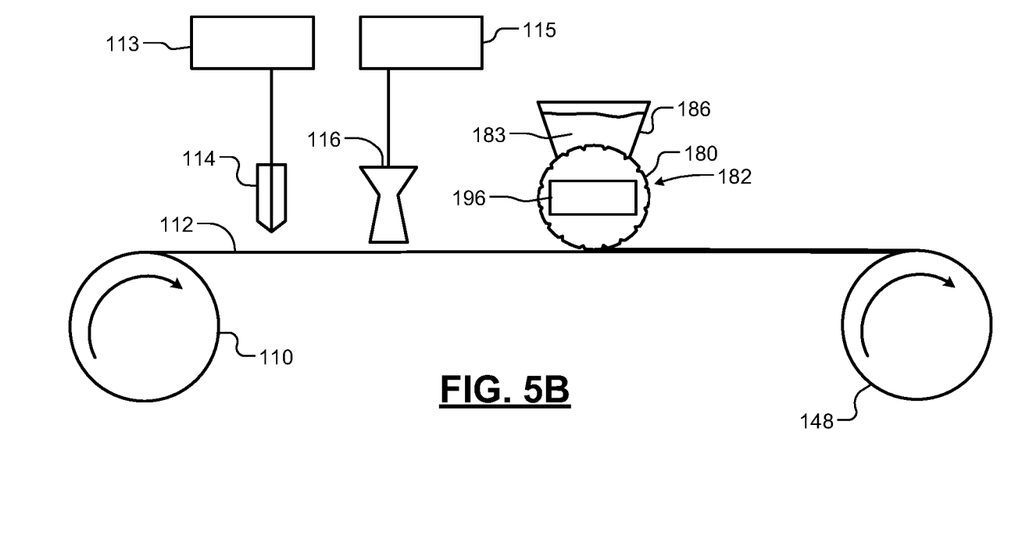

Referring now to FIGS. 5A and 5B, an engraved roller 180 includes a plurality of cavities 182 configured to receive lithium metal powder 183 from a source 186 of lithium powder. The engraved roller 180 creates a pattern 190 of lithium metal powder 183 at spaced intervals (e.g., corresponding to spacing of the cavities 182) on the anode current collector 112. In FIG. 5A, the anode current collector 112 with the pattern 190 of lithium powder at spaced intervals passes through an oven 192 to melt the lithium powder into molten lithium. The molten lithium flows to create a uniform layer of lithium metal. In some examples an additional roller is arranged between the oven 192 and the winding roller 148 to further improve the uniformity of the lithium metal layer (not shown). In some examples, the engraved roller 180 is heated by a heater 196 (instead of or in addition to the oven 192) as shown in FIG. 5B.

In FIG. 5B, the anode current collector 112 and the pattern 190 of lithium powder pass the engraved roller 180 including a heater 196 to heat the lithium powder to melt the lithium powder into molten lithium. The molten lithium flows to create a lithium layer on the lithiophilic surface. As can be appreciated, the thickness of the lithium layer can be controlled by the speed of the engraved roller, the temperature of the heater 196, and/or the amount of lithium powder in each of the cavities 182.

Figure 5C:
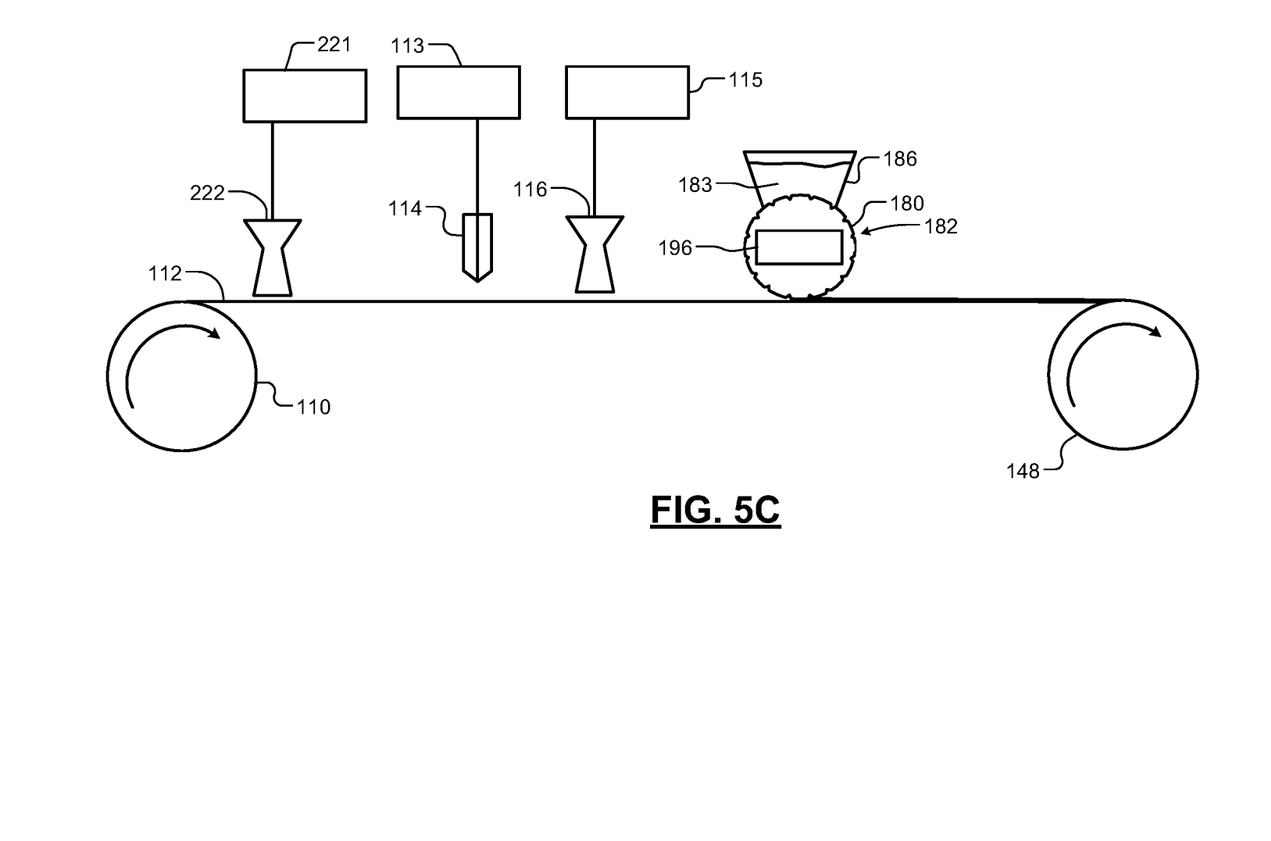

In FIG. 5C, an additional plasma modification can be performed prior to coating with the precursor coating. A gas source 221 supplies a plasma gas mixture to a plasma electrode 222. In some examples, the plasma gas mixture comprises molecular oxygen. The plasma modification forms an oxide layer on the anode current collector (or limited to the first portion or the second portion) prior to coating the first portion with the precursor coating.

Figure 6:
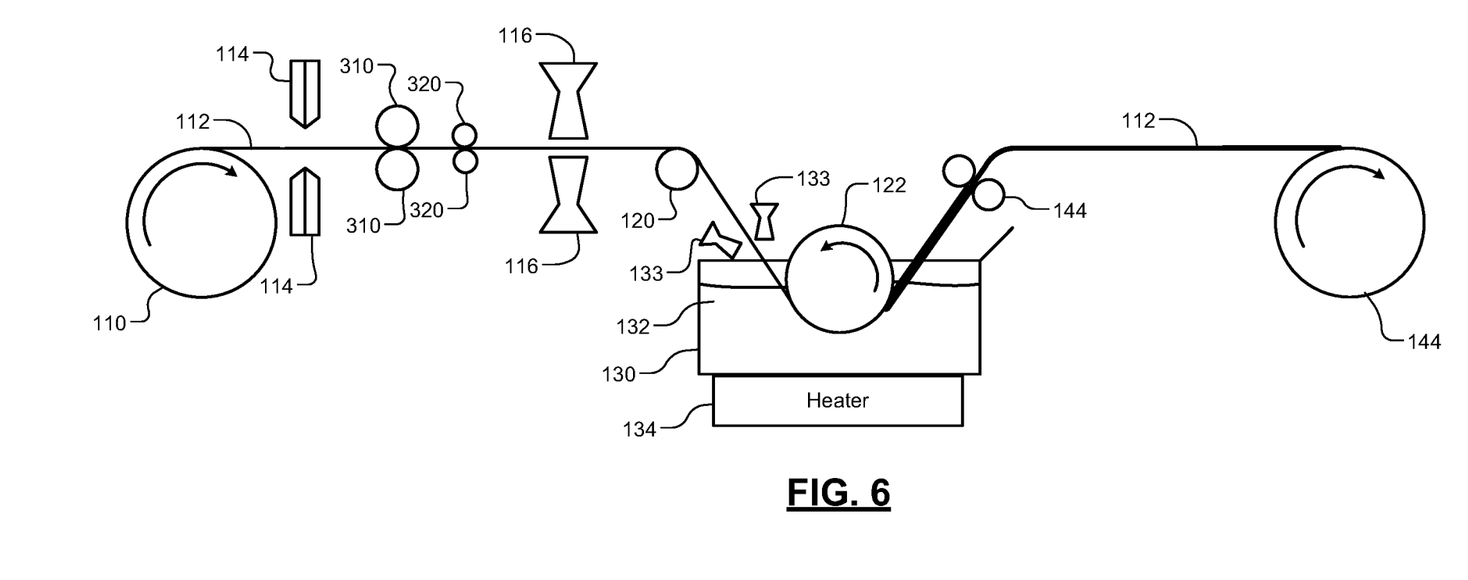
FIGS. 6 and 7 are functional block diagrams of an example of a method for tuning lithium wettability by coating the anode current collector, cooling the first portion and pre-heating the second portion, plasma modification, and then coating with molten lithium according to the present disclosure.
Figure 7:
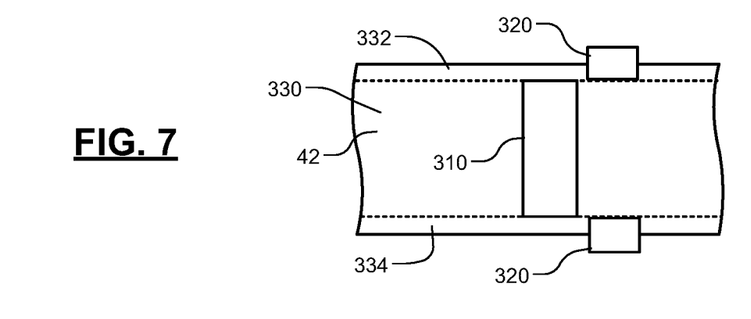

Referring now to FIGS. 6 and 7, cooling of the first portion and preheating of the second portion of the anode current collector can be performed prior to plasma modification when using some types of materials (e.g., stainless steel) as the anode current collector. Rollers 310 apply heat (and/or pressure) to the anode current collector 112 after coating the first portion with the precursor coating. In some examples, the rollers 310 (on opposite sides of the anode current collector 112) heat a second portion 330 to a temperature in a range from 250° C. to 400° C. In some examples, edge cooling rollers 320 are arranged at one or both edges 322, 324 of the anode current collector 112. In some examples, the edge cooling rollers 320 have a temperature in a range from 10° C. to 25° C. If both edges 332 and 334 are coated with the precursor coating, the anode electrode can be split into two anode electrodes.

Surface modification can be used for alternative current collector materials such as stainless steel (which is cheaper and lighter than copper) for manufacturing lithium anode electrodes. The stainless steel comprises standard foil, mesh and/or expanded metal. In some examples, the plasma modification (e.g., using plasma gas such as molecular nitrogen) applied to the preheated anode current collector removes a passive surface layer (which is lithiophobic) on the stainless steel. For example, modification with nitrogen plasma forms a thin chromium nitride layer on the stainless-steel substrate, which will be effective in wetting molten lithium onto the stainless steel anode current collector. The temperature range of the rollers 310 is based on the desired thickness of the nitrided layer. In some examples, a thickness of the nitrided layer is in a range from 2 nm to 2 μm. In some examples, the stainless steel grade that is used for the anode current collector is selected from a group consisting of 304 or 316L stainless steel. Additionally, in some examples, the plasma treatment directed to the molten lithium surface immediately prior to contacting the stainless steel brings about the creation of Li—X bonds that are more wettable to the stainless steel.

In some examples, a width of the rollers 310 is equal to the width of the second portion 330 including an active material layer of the anode current collector (the second portion 330 is treated by the plasma to increase wettability to molten lithium). The edge regions 332 and 334 of the anode current collector pass through the edge cooling rollers 320 to remain at or near room temperature to avoid plasma activation/wetting. As a result, the edge region 332 of the anode current collector remains lithiophobic to avoid coating lithium in regions with the external tabs 28 and 48. While heated rollers are shown, pre-heating of the anode current collector can be performed using plasma heating, infrared (IR) heating, furnace heating, and/or induction heating.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for manufacturing an anode electrode, comprising:
   supplying an anode current collector;
   coating a first portion of the anode current collector with a lithiophilic coating;
   not coating a second portion of the anode current collector with the lithiophilic coating;
   treating the anode current collector with plasma to at least one of decrease lithium wettability of the first portion by facilitating a chemical reaction of the lithiophilic coating and to increase lithium wettability of the second portion; and
   coating the anode current collector with lithium metal to form an anode active material layer,
   wherein coating the anode current collector with the lithium metal comprises supplying lithium metal powder at spaced intervals on the anode current collector using an engraved roller including a plurality of cavities and heating the lithium metal powder to melt the lithium metal powder.

2. The method of claim 1, wherein the first portion corresponds to an edge of the anode current collector.

3. The method of claim 1, wherein coating the anode current collector with lithium metal comprises passing the anode current collector through a bath including molten lithium metal.

4. The method of claim 3, further comprising directing gas at the anode current collector after the anode current collector passes through the bath to at least one of remove excess molten lithium metal and improve thickness uniformity of the molten lithium metal.

5. The method of claim 4, wherein the gas is selected from a group consisting of molecular nitrogen and argon.

6. The method of claim 1, further comprising injecting a secondary gas into the plasma, wherein the secondary gas includes at least one element that creates bonds on a surface of the anode current collector that increases wettability to lithium.

7. The method of claim 1, wherein coating the anode current collector with the lithium metal comprises supplying molten lithium metal onto the anode current collector using a coating device.

8. The method of claim 1, further comprising heating the engraved roller to melt the lithium metal powder.

9. The method of claim 1, wherein heating the lithium metal powder comprises heating using at least one of plasma, infrared heating, a furnace, an oven, and induction heating.

10. The method of claim 1, further comprising supplying a plasma gas for the plasma that includes one or more elements selected from a group consisting of nitrogen (N), phosphorus (P), oxygen (O), a halogen, and/or combinations thereof.

11. The method of claim 1, further comprising supplying a plasma gas for the plasma selected from a group consisting of molecular nitrogen ($N_2$), ammonia ($NH_3$), an amine compound, a silazane, and/or combinations thereof.

12. The method of claim 1, further comprising treating the anode current collector with plasma comprising molecular oxygen prior to coating the first portion of the anode current collector with the lithiophilic coating.

13. The method of claim 1, wherein the anode current collector is made of stainless steel and further comprising heating the second portion of the anode current collector to a temperature in a range from 250° C. to 400° C. prior to treating the anode current collector with plasma.

14. The method of claim 13, further comprising cooling the first portion of the anode current collector to a temperature in a range from 10° C. to 25° C. prior to treating the anode current collector with plasma.

15. A method for manufacturing an anode electrode, comprising:
  supplying an anode current collector;
  coating a first portion of the anode current collector with a lithiophilic coating wherein the first portion corresponds to an edge of the anode current collector;
  not coating a second portion of the anode current collector with the lithiophilic coating, wherein the second portion corresponds to a location where an anode active material layer of the anode current collector is arranged;
  treating the anode current collector with plasma to at least one of decrease lithium wettability of the first portion by facilitating a chemical reaction of the lithiophilic coating and to increase lithium wettability of the second portion,
  wherein a plasma gas for the plasma includes one or more elements selected from a group consisting of molecular nitrogen ($N_2$), ammonia ($NH_3$), an amine compound, a silazane, and/or combinations thereof; and
  coating the anode current collector with lithium metal to form the anode active material layer by passing the anode current collector through a bath including molten lithium metal,
  wherein coating the anode current collector with the lithium metal comprises supplying lithium metal powder at spaced intervals on the anode current collector using an engraved roller including a plurality of cavities and heating the lithium metal powder to melt the lithium metal powder.

16. The method of claim 15, further comprising directing gas at the anode current collector after the anode current collector passes through the bath to at least one of remove excess molten lithium metal and improve thickness uniformity of the molten lithium metal, wherein the gas is selected from a group consisting of molecular nitrogen and argon.

17. The method of claim 15, further comprising injecting a secondary gas into the plasma.

18. The method of claim 15, further comprising treating the anode current collector with oxygen plasma prior to coating the first portion of the anode current collector with the lithiophilic coating.

19. A method for manufacturing an anode electrode, comprising:
  supplying an anode current collector;
  coating a first portion of the anode current collector with a lithiophilic coating;
  not coating a second portion of the anode current collector with the lithiophilic coating;
  treating the anode current collector with plasma to at least one of decrease lithium wettability of the first portion by facilitating a chemical reaction of the lithiophilic coating and to increase lithium wettability of the second portion; and
  coating the anode current collector with lithium metal to form an anode active material layer,
  wherein the method further includes cooling the first portion of the anode current collector to a temperature in a range from 10° C. to 25° C. prior to treating the anode current collector with plasma.

20. The method of claim 19, wherein coating the anode current collector with the lithium metal comprises:
  supplying lithium metal powder at spaced intervals on the anode current collector using an engraved roller including a plurality of cavities; and
  heating the lithium metal powder to melt the lithium metal powder.

* * * * *